United States Patent [19]

Mui et al.

[11] Patent Number: 4,848,874

[45] Date of Patent: Jul. 18, 1989

[54] VIDEO MONITOR SHADE

[76] Inventors: Paul Y. Mui; Rosa Tso, both of 118 Tammy Cir., West Pittsburg, Calif. 94565

[21] Appl. No.: 179,198

[22] Filed: Apr. 8, 1988

[51] Int. Cl.⁴ .................................... G02B 27/00
[52] U.S. Cl. ............................ 350/276 R; 358/255
[58] Field of Search ............ 350/276 R, 276 SL, 322; 358/252, 255

[56] References Cited

U.S. PATENT DOCUMENTS

| | | |
|---|---|---|
| 2,482,031 | 9/1949 | Rose . |
| 3,733,436 | 5/1973 | Rose ................................. 358/255 |
| 3,781,471 | 12/1973 | Hoffberger . |
| 3,849,598 | 11/1974 | Hoffberger . |
| 3,961,159 | 6/1976 | Hursey ............................. 350/276 |
| 4,253,737 | 3/1981 | Thomsen ....................... 350/276 R |
| 4,444,465 | 4/1984 | Giulie et al. ................... 350/276 R |
| 4,529,268 | 7/1985 | Brown ........................... 350/276 R |
| 4,569,572 | 2/1986 | Kopich ......................... 350/276 R |
| 4,633,324 | 12/1986 | Giulie ............................. 358/255 |

FOREIGN PATENT DOCUMENTS 1022727  3/1966  United Kingdom .

Primary Examiner—Bruce Y. Arnold
Assistant Examiner—Loha Ben
Attorney, Agent, or Firm—Townsend and Townsend

[57] ABSTRACT

A video monitor shade (2) is removably mounted to a video monitor (4) to shield the video screen (104) from glare. The video shade includes a generally horizontal top shade (8, 60, 80), having a horizontal portion and a downwardly and forwardly extending second portion (102), and a pair of side shades secured to the lateral ends (10) of the top shade. Portions of the top and side shades extend forward of the video screen to shield the video screen from unwanted glare. The video shade is supported on the monitor by mounting screws (22), mounted to the side shades and having heads (24) which press against the sides (26) of the video monitor housing (6). The head can press against the housing directly or through an L-shaped adapter (44). The adapter includes a U-shaped receptacle or channel (52) configured for vertically supporting and horizontally housing the head of the mounting screw. The top shade can be a single width or can be made from telescoping elements (62, 64, 90, 94) which can assume a range of widths according to the width of the video monitor housing.

24 Claims, 3 Drawing Sheets

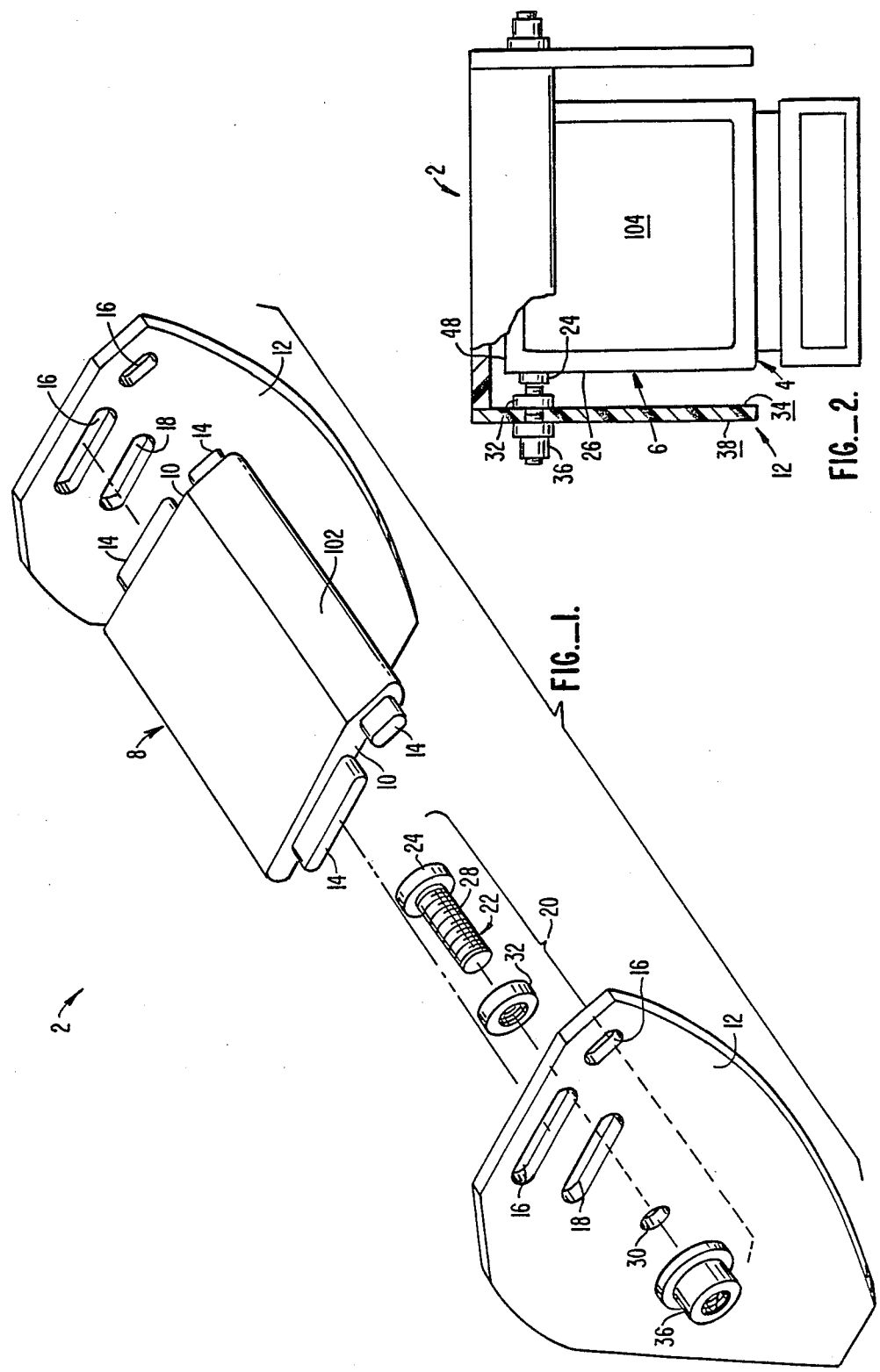

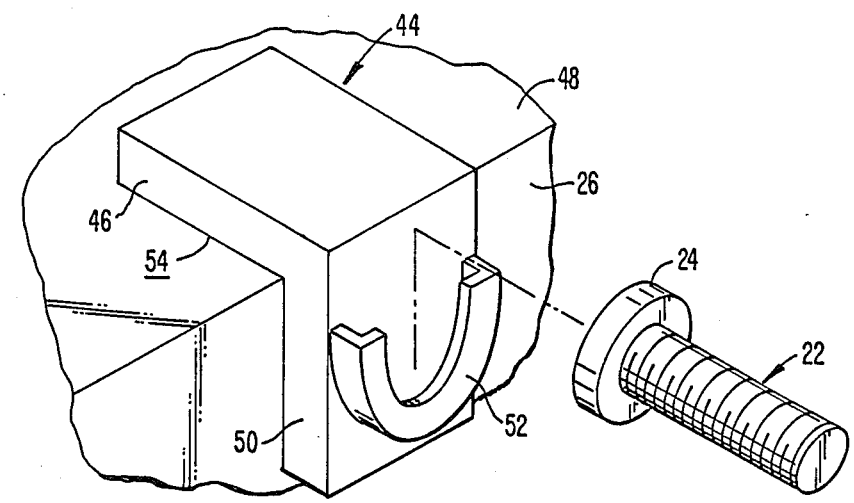
FIG._3.
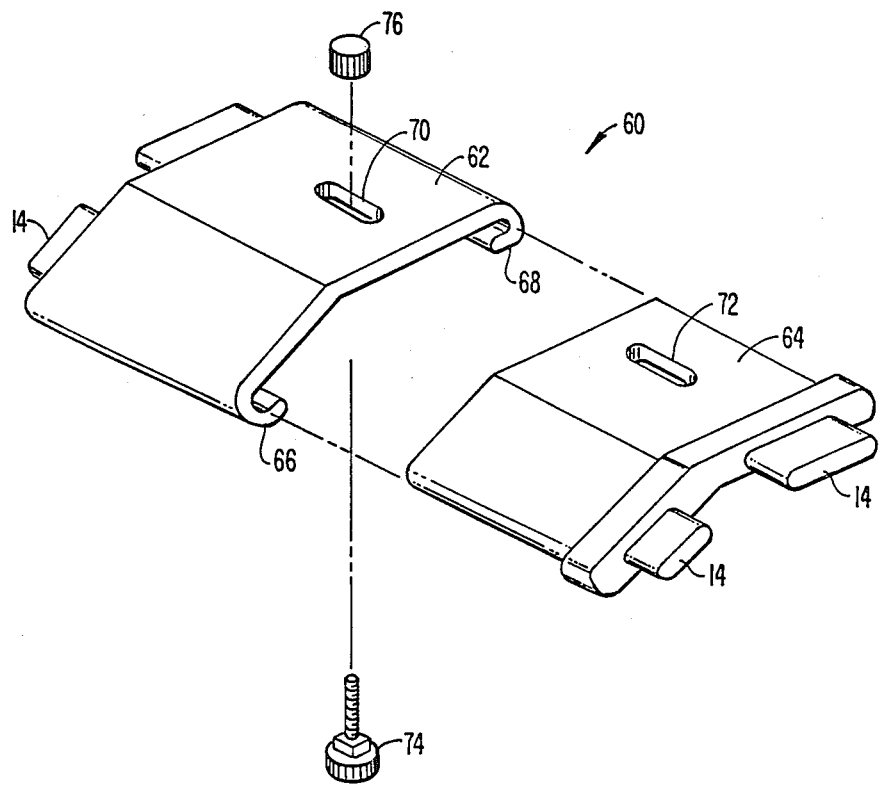
FIG._4.

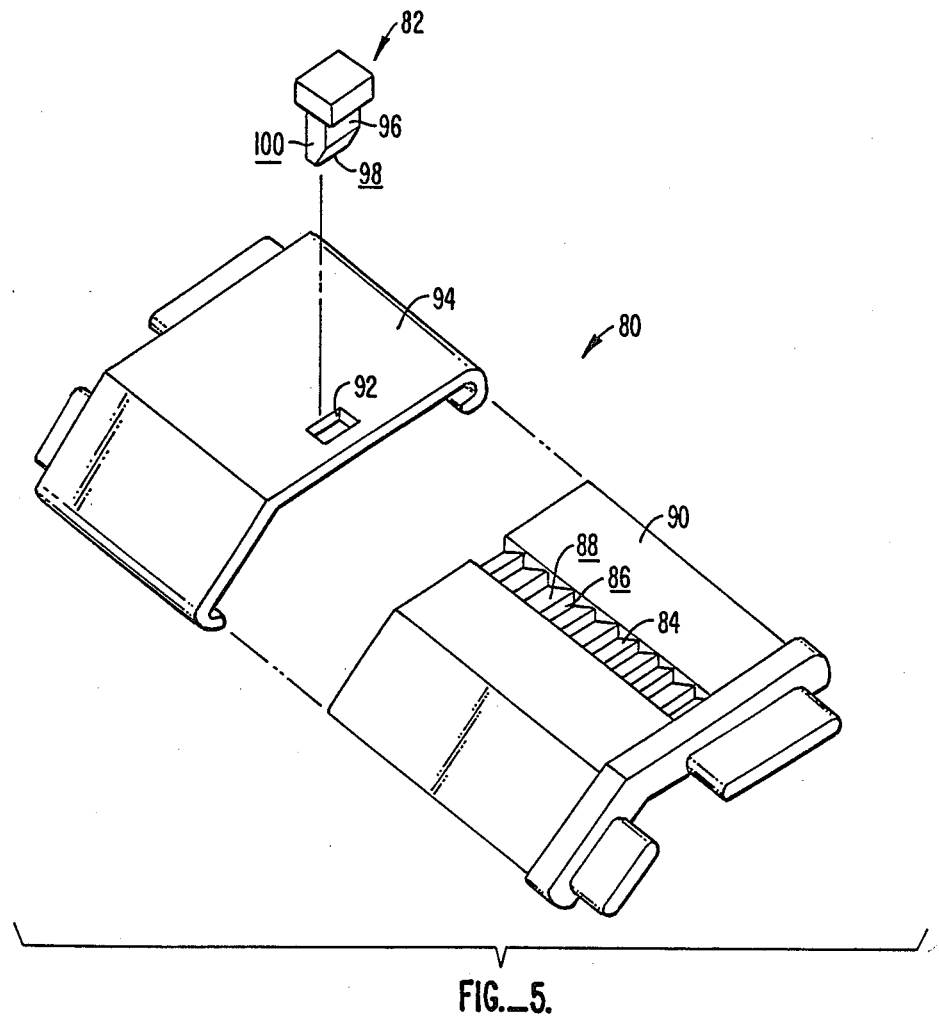
FIG._5.

VIDEO MONITOR SHADE

BACKGROUND OF THE INVENTION

Problems associated with short term and long term use of video monitors have been well documented. Some problems can be solved by having the operator look off into the distance at appropriate intervals to allow the eyes to change their focus. Another problem arises from glare. To reduce glare, various screens and shield have been devised. Some types, such as that shown in U.S. Pat. No. 4,444,465, mounted to the cabinet of the video monitor and extend from the top and sides of the cabinet. Other types use various anti-glare elements over the screen itself. For example, U.S. Pat. No. 4,253,737 shows one such device. However, the art has failed to solve the problems of reducing glare for the user with an adjustable, easily removable video monitor shade which is both attractive and effective.

SUMMARY OF THE INVENTION

Applicant's invention is directed to a video monitor shade which combines simplicity of construction flexibility and ease of use with an effective yet aesthetically pleasing design.

The video shade includes a generally horizontal top shade, a pair of generally vertical side shades and mounting elements associated with each of the side shades for engaging the side of the monitor housing. The video shade preferably has a first, generally horizontal portion and a second, downwardly and forwardly extending portion. The second portion extends forward of the video screen. That is, the angled portion of the top shade extends past a vertical plane defined by the video screen. Likewise, portions of the side shades extend forward of the video screen.

The top shade may have a fixed or a variable width. If a variable width, the top shade may be constructed to have a discrete number of possible widths or a continuous range of possible widths.

The mounting elements include, in the preferred embodiment, threaded elements mounted to the side shades, the threaded elements being forced against the sides of the housing to secure the video shade to the housing. The heads of the threaded elements may rest directly against the sides of the housing or they may rest against adapters positioned between the housing and the heads. The adapters may each have a receptacle for vertically supporting and horizontally capturing the head of the threaded element.

An advantage of the invention is that it is made from relatively simple elements and can thus be produced at low cost. The video shade is, however, quite flexible in the range of sizes of video monitors it can be used with through both the adjustable mounting elements and the use of variable width top shades. Also, the dog-leg shaped top shade provides an aesthetically pleasing yet functional overhead shade element for the user. The use of an adapter with the mounting elements both protects the finish of the video monitor housing and helps to maintain the video shade in the desired position on the video monitor.

Other features and advantages of the invention will appear from the following description in which the preferred embodiment has been set forth in detail in conjunction with the accompanying drawings.

BRIEF DESCRIPTION OF THE DRAWINGS

FIG. 1 is an exploded isometric view of a first embodiment of a video shade made according to the invention.

FIG. 2 is a front view showing the video shade of FIG. 1 mounted to a video monitor.

FIG. 3 is an isometric view of an adapter configured for use with the mounting screw of FIG. 1.

FIG. 4 is an exploded isometric view of an alternative embodiment of the top shade of FIG. 1.

FIG. 5 is an exploded isometric view of a second alternative embodiment of top shade of FIG. 1.

DETAILED DESCRIPTION OF THE DRAWINGS

Referring now to FIGS. 1 and 2, a video monitor shade 2 is shown with a video monitor 4 and mounted to the housing 6 of the video monitor. Video monitor shade 2 includes a generally horizontal, dog-leg shaped top shade 8 having ends 10 to which side shades 12 are mounted. The mounting is provided through extensions 14, extending from ends 10, matingly engaged within slots 16 formed in side shades 12. Side shades 12 include hand hold openings 18 for carrying shade 2.

Shade 2 also includes mounting assemblies 20 at each side shade 12. Assemblies 20 each include a mounting screw 22 having a head 24 which presses against the side 26 of housing 6 and a shank 28 which passes through a through hole 30 in side shade 12. Assemblies 20 each include a threaded jamb nut 32 threadably mounted to shank 28 opposite the inside surface 34 of side shade 12 and a locking nut 36 threaded onto shank 28 opposite the outside surface 38 of side shade 12. Appropriate manipulation of screw 22 and nuts 32, 36, allows the user to force head 24 against side 26 of housing 6 thus supporting shade 2 in place.

In the preferred embodiment, through holes 30 are vertically aligned with the center of gravity of shade 2 so that shade 2 does not have any significant tendency to pivot about shanks 28 of screws 22. If desired, additional mounting assemblies 20, or other structure made to stabilize shade 2 on housing 6, could be used as well.

Referring now to FIG. 3, an L-shaped adapter 44 is shown in conjunction with a mounting screw 22. Adapter 44 is sized so that one leg 46 rests on the top 48 of housing 6 while the other leg 50 lies against a side 26 of the housing. Adapter 44 includes a U-shaped receptacle 52 having a generally L-shaped cross-sectional shape sized for receipt of disk like head 24. Receptacle 52 thus vertically supports and horizontally captures head 24 of mounting screw 22 to help maintain shade 2 in a proper position on housing 6. If desired, a pressure sensitive or other adhesive may be used on the bottom surface 54 of leg 46 of adapter 44 to help keep adapter 44 from shifting on housing 6.

In FIG. 4 an alternative embodiment of top shade 8 of FIG. 1 is shown. Top shade 60 is shown to include first and second parts 62, 64 telescopically mounted to one another by virtue of lips 66, 68 on first part 62. Parts 62, 64 include slots 70, 72 formed therein in alignment with one another for the receipt of a threaded locking post 74 which passes through slots 72, 70. A locking nut 76 threadably engages post 74 from above to allow the user to fix the width of top shade 60 over a continuous range of widths.

Turning now to FIG. 5, a second alternative embodiment of the top shade of FIG. 1 is shown. Top shade 80 is similar to top shade 60 but uses a ratchet mechanism 82 to provide a range of discrete adjustable widths for the top shade 80. Ratchet mechanism 82 includes a series of notches 84 having vertical sides 86 and ramped sides 88 formed in a first part 90 of top shade 80. Notches 84 are aligned with a slot 92 formed in a second part 94 of top shade 80. A ratchet peg 96 is positioned in slot 92 and includes an inclined surface 98 and a vertical surface 100 corresponding to inclined and vertical surfaces 88, 86 of notches 84. Accordingly, parts 90, 94 of top shade 80 can be freely telescoped into one another to reduce the width of the top shade, but engagement of vertical surfaces 86, 100 limits the amount of telescopic expansion of parts 90, 94 which can occur without displacing ratchet peg 96 from notches 84. Thus, top shade 80 provides the user with a number of discrete widths of the top shade.

In use, a video monitor shade 2 (or 60 or 80) is positioned over a video monitor 4 so that portions of side shades 12 and, preferably, a downwardly and forwardly extending part 102 of top shade 8 extend forward of the video screen 104 of video monitor 4, that is past a generally vertical plane defined by the video screen. Adaptors 44 are, if desired, mounted to housing 6 and mouting assemblies 20 are manipulated to secure shade 2 in place. If top shades 60 or 80 are used, the user will adjust the width of the top shade according to the width of video monitor 4.

Modification and variation can be made to the disclosed embodiments without departing from the subject of the invedntion as defined in the following claims. For example, instead of biasing heads 24 against sides 26 of housing 6 using threaded nuts 32, 36 and threaded shank 28, heads 24 could be spring biased against sides 26.

What is claimed is:

1. A video monitor shade for use with a video monitor of the type having a top, sides and a front at which a video screen is mounted, the shade comprising:
   a generally horizontal, dog-leg-shaped top shade having a first, horizontal portion and a second, downwardly and outwardly angled portion;
   generally vertical side shades mounted to either side of the top shade; and
   mounting elements, associated with both side shades, engaging the sides of the video monitor so as to support the video monitor shade in position on the video monitor with the second portion of the top shade and parts of the side shades forward of a plane defined by the video screen.

2. The shade of claim 1 wherein the top shade is an adjustable width top shade including first and second parts.

3. The shade of claim 2 wherein the top shade includes a ratchet mechanism for adjusting the relative positions of the first and second parts thereby adjusting the width of the top shade.

4. The shade of claim 3 wherein the ratchet mechanism limits the extension of the top shade past any one of a plurality of widths.

5. The shade of claim 2 wherein the first and second parts include at least one elongate opening.

6. The shade of claim 5 wherein the top shade includes a fastener element, passing through the at least one elongate opening and engaging the first and second parts, which secures the first and second parts to one another over a continuous range of widths.

7. The shade of claim 6 wherein the first part includes the at least one elongate opening and the second part includes another opening and the fastener element includes nut and bolt members, the bolt member passing through said openings in the first and second parts.

8. The shade of claim 1 wherein the side shades include hand hold openings for grasping by a user.

9. The shade of claim 1 wherein the mounting elements include laterally movable members having heads extending towards the sides of the monitor, the heads adapted to engage the sides of the monitor.

10. The shade of claim 9 wherein the laterally movable members are threaded.

11. The shade of claim 9 wherein the mounting elements include an adapter mountable to each side of the monitor through which the heads engage the sides.

12. The shade of claim 11 wherein each adapter includes a receptacle portion for vertically supporting the head.

13. The shade of claim 11 wherein each adapter includes a receptacle portion for vertically supporting and horizontally capturing the head.

14. A video monitor shade for use with a video monitor of the type having a top, sides and a front at which a video screen is mounted, the shade comprising:
   generally horizontal top shade, having lateral ends, overlying the top of the monitor, a portion of the top shade extending forward of a plane defined by the video screen to shade the video screen;
   generally vertical side shades mounted to the lateral ends of the top shade, portions of the side shades extending forward of the video screen plane to shade the video screen; and
   laterally movable mounting elements, movably mounted to the side shades, having heads engaging the sides of the monitor so as to support the video monitor shade on the video monitor.

15. The shade of claim 14 wherein the laterally movable mounting element are threaded.

16. The shade of claim 14 wherein the mounting elements include an adapter mountable to each side of the monitor through which the heads engage the sides.

17. The shade of claim 16 wherein each adapter includes a receptacle portion for vertically supporting the head.

18. The shade of claim 16 wherein each adapter includes a receptacle portion for vertically supporting and horizontally capturing the head.

19. A video monitor shade for use with a video monitor of the type having a top, sides and a front at which a video screen is mounted, the shade comprising:
   a generally horizontal, dog-legged-shaped top shade, having a first, horizontal portion overlying the top of the monitor and a second, downwardly and outwardly angled portion extending forward of a plane defined by the video screen to shade the video screen, the first portion having lateral ends;
   generally vertical side shades mounted to the lateral ends of the top shade, portions of the side shades extending forward ofthe video screen plane to shade the video screen;
   L-shaped adapters mountable to the monitor, the adapters each including a first leg adjacent to the top of the monitor, a second leg adjacent to a side of the monitor and an outwardly facing, U-shaped receptacle portion at the second leg, the receptacle portion having L-shaped cross-sectional shape;
   laterally movable mounting elements, movably mounted to the side shades, having heads engaging the sides of the monitor through the adapters so as to support the video monitor shade on the video monitor, the heads being vertically supported and horizontally captured by the receptacle portions; and means for biasing the mounting elements against the adapters.

20. A video monitor shade for use with a video monitor of the type having a top, sides and a front at which a video screen is mounted, the shade comprising:

a generally horizontal, dog-leg-shaped top shade including lateral sides with an extension, having a first, horizontal portion and a second downwardly and outwardly angled portion;

generally vertical side shades defining a slot sized for mating engagement with the extension in the top shade, mounted to either side of the top shade; and mounting elements, associated with both side shades, engaging the sides of the video monitor so as to support the video monitor shade in position on the video monitor with the second portion of the top shade and parts of the side shades forward of a plane defined by the video screen.

21. A video monitor shade for use with a video monitor of the type having a top, sides and a front at which a video screen is mounted, the shade comprising:

a generally horizontal, dog-leg-shaped top shade having a first, horizontal portion and a second downwardly and outwardly angled portion;

generally vertical side shades mounted to either side of the top shade; and mounting elements, associated with both side shades, each including a laterally movable threaded member and an adapter, for supporting the video monitor shade in position on the video monitor with the second portion of the top shade and parts of the side shades forward of a plane defined by the video screen;

the laterally movable threaded member including a head extending towards and adapted to engage a side of the monitor;

the adapter, mountable to a side of the monitor, including a U-shaped receptacle portion having an L-shaped cross-section for vertically supporting and horizontally capturing the head of the laterally movable threaded member, the head engaging the side of the video monitor through the adapter.

22. A video monitor shade for use with a video monitor of the type having a top, sides and a front at which a video screen is mounted, the shade comprising:

a generally horizontal, dog-leg-shaped top shade having a first, horizontal portion and a second downwardly and outwardly angled portion;

generally vertical side shades mounted to either side of the top shade; and mounting elements, associated with both side shades, each including a laterally movable member and an adapter mountable to a side of the monitor, for supporting the video monitor shade in positio on the video monitor with the second portion of the top shade and parts of the side shades forward of a plane defined by the video screen;

the adapter having a generally L-shape with a first leg engaging the top of the monitor, and a second leg adjacent a side of the monitor;

the laterally movable member including a head extending towards and adapted to engage a side of the monitor, the head engaging the side of the video monitor through the adapter.

23. A video monitor shade for use with a video monitor of the type having a top, sides and a front at which a video screen is mounted, the shade comprising:

a generally horizontal top shade, having lateral ends, overlying the top of the monitor, a portion of the top shade extending forward of a plane defined by the video screen to shade the video screen;

generally vertical side shades mounted to the lateral ends of the top shade, portions of the side shades extending forward of the video screen plane to shade the video screen; and a laterally movable mounting element, movably mounted to a side shade, including a head and an adapter;

the head engaging a side of the monitor so as to support the video monitor shade on the video monitor;

the adapter mountable to a side of the monitor and including a U-shaped receptacle portion having an L-shaped cross-section for vertically supporting and horizontally capturing the head, the head passing through the receptacle and engaging the side of the monitor.

24. A video monitor shade for use with a video monitor of the type having a top, sides and a front at which a video screen is mounted, the shade comprising:

a generally horizontally top shade, having lateral ends, overlying the top of the monitor, a portion of the top shade extending forward of a plane defined by the video screen to shade the video screen;

generally vertical side shades mounted to the lateral ends of the top shade, portions of the side shades extending forward of the video screen plane to shade the video screen; and a laterally movable mounting element, movably mounted to a side shade, including a head and an adapter;

the head engaging a side of the monitor so as to support the video minotor shade on the video monitor;

the adapter mountable to a side of the monitor and being generally L-shaped with a first leg engaging the top of the monitor and a second leg adjacent a side of the monitor, the head engaging the side of the monitor through the adapter.

* * * * *